United States Patent [19]

Chapin

[11] Patent Number: 4,833,880
[45] Date of Patent: May 30, 1989

[54] FLUIDIC SET POINT AMPLIFIER APPARATUS AND METHOD, AND USES THEREOF

[75] Inventor: Donald W. Chapin, Scottsdale, Ariz.

[73] Assignee: Allied-Signal Inc., Morris Township, Morris County, N.J.

[21] Appl. No.: 262,926

[22] Filed: Oct. 26, 1988

[51] Int. Cl.$^4$ .............................................. F02C 9/10
[52] U.S. Cl. ................................. 60/39.281; 137/820; 137/833; 137/835; 137/840; 137/569
[58] Field of Search .............. 137/833, 834, 835, 840, 137/814, 819, 565, 820, 569; 60/39.281

[56] References Cited

U.S. PATENT DOCUMENTS

| | | | |
|---|---|---|---|
| 2,668,415 | 2/1954 | Lawrence | 60/39.281 |
| 3,030,979 | 4/1962 | Reilly | 137/624.14 |
| 3,302,398 | 2/1967 | Taplin et al. | 60/39.28 |
| 3,335,737 | 8/1967 | Gesell | 137/832 |
| 3,347,251 | 10/1967 | Gobhai | 137/814 |
| 3,461,892 | 8/1969 | Boothe et al. | 137/18 |
| 3,469,395 | 9/1969 | Spitsbergen et al. | 60/39.28 |
| 3,473,545 | 10/1969 | Boyadjieff | 137/813 |
| 3,474,813 | 10/1969 | Servanty et al. | 137/842 |
| 3,486,521 | 12/1969 | Mayer | 137/813 |
| 3,488,948 | 1/1970 | Cornett et al. | 60/39.28 |
| 3,511,576 | 5/1970 | Herbstritt et al. | 415/27 |
| 3,517,685 | 6/1980 | Eastman | 137/81.5 |
| 3,565,091 | 2/1971 | Auger | 417/174 |
| 3,616,647 | 11/1971 | Johnson | 60/39.28 |
| 3,630,023 | 12/1971 | Lazar et al. | 60/39.28 |
| 3,630,217 | 12/1971 | Bell | 137/806 |
| 3,638,672 | 7/1970 | Smith et al. | 137/813 |
| 3,645,094 | 2/1972 | Suggs | 137/569 |
| 3,682,192 | 8/1972 | Davies | 137/805 |
| 3,717,164 | 2/1973 | Griffin | 137/819 |
| 3,783,903 | 1/1974 | Cantwell | 137/805 |
| 3,811,473 | 5/1974 | Schwarz | 137/810 |
| 3,830,096 | 8/1974 | Hirao et al. | 137/842 |
| 3,958,412 | 5/1976 | Frederick | 60/39.28 |
| 4,508,127 | 4/1985 | Thurston | 137/835 |

FOREIGN PATENT DOCUMENTS

| | | |
|---|---|---|
| 1520896 | 4/1968 | France . |
| 805339 | 2/1981 | U.S.S.R. . |
| 840535 | 6/1981 | U.S.S.R. . |

Primary Examiner—A. Michael Chambers
Attorney, Agent, or Firm—Terry L. Miller; James W. McFarland

[57] ABSTRACT

A fluidic set point amplifier provides an output signal which is strongly linear with respect to pressure of fluid supply, free of hysteresis, and has a zero crossing (set point) at a determined value of supply pressure. Uses of the set point amplifier include an all-fluidic pressure regulator, and a turbine engine fuel control having only a single moving part.

20 Claims, 3 Drawing Sheets

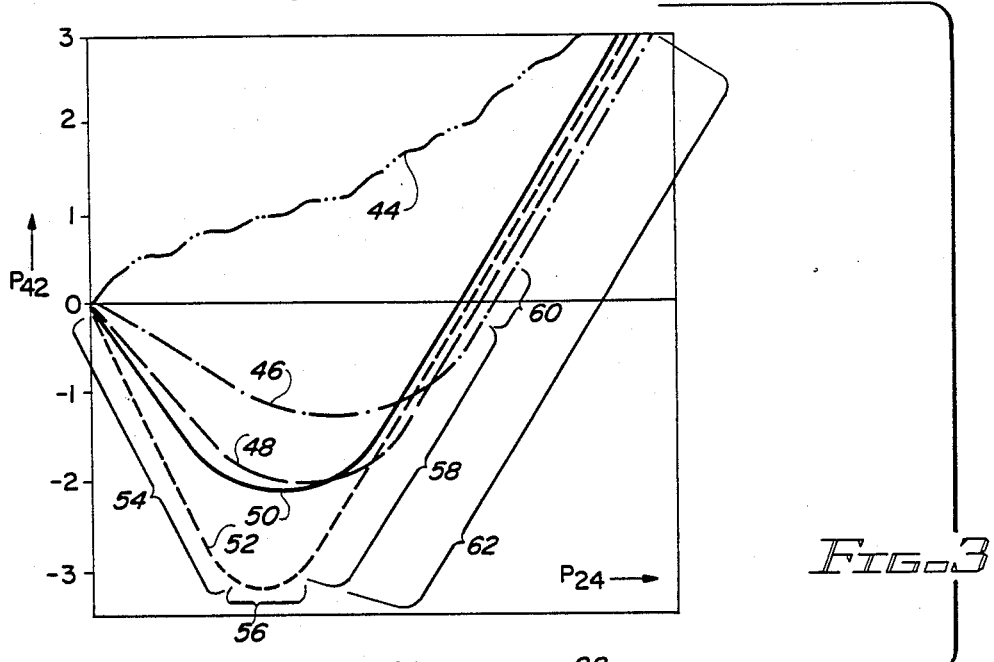
FIG-3
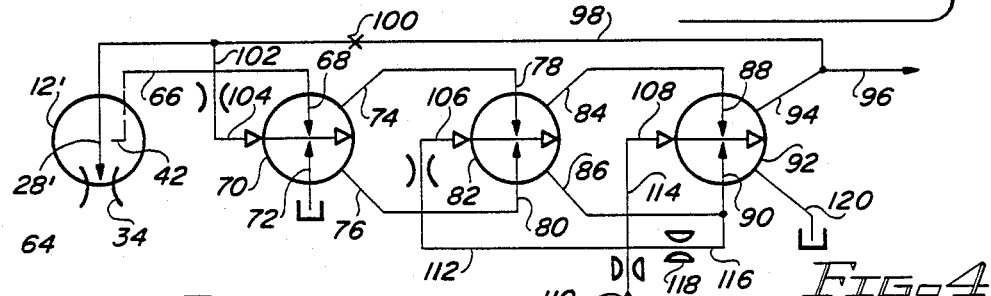
FIG-4
FIG-5
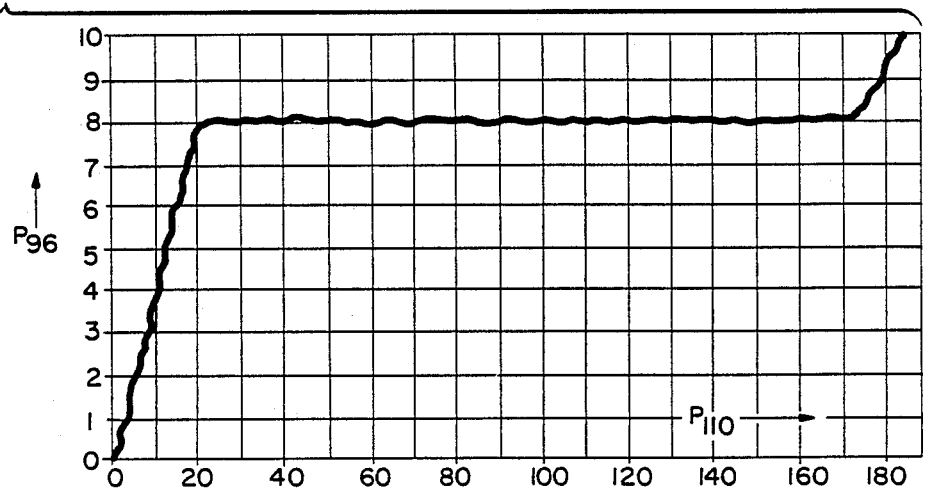

FLUIDIC SET POINT AMPLIFIER APPARATUS AND METHOD, AND USES THEREOF

TECHNICAL FIELD

The invention is in the field of fluidic devices. Particularly, the invention relates to a fluidic set point amplifier apparatus providing a fluid pressure output signal which initially bears an inverse relationship to fluid pressure provided to an inlet of the apparatus and which thereafter transitions to a linear proportional relationship with increasing fluid pressure at the inlet. The fluid pressure output signal is substantially free of hysteresis.

Further to the above, the present invention provides a unique fluidic fluid pressure regulator including a fluidic set point amplifier apparatus as described above. Because the output fluid pressure signal of the fluidic set point amplifier is initially increasingly negative with respect to increasing input fluid pressure (negative gain) and thereafter becomes positive and strongly linear, at a certain (or set point) input fluid pressure the output fluid pressure signal equals zero. Fluidic proportional amplifiers are employed to control an output fluid pressure to the set point pressure despite variation of an inlet fluid pressure. Alternatively, the output fluid pressure may be controlled to a selected level offset relative to the set point fluid pressure. The fluidic fluid pressure regulator of the present invention is totally free of moving parts.

Still further, the present invention provides an inventive fluidic turbine engine fuel control including a fluidic set point amplifier apparatus as described above. The present fuel control apparatus responds to the variable compressor discharge pressure ($P_{CD}$) of a turbine engine and supplies fuel to the engine according to a schedule which controls the $P_{CD}$, and the engine speed, within a narrow range.

BACKGROUND OF THE INVENTION

Conventional fluidic systems traditionally employ a source of clean, dry pressurized air, such as filtered and dried shop air, which is also reduced to a pressure appropriate for use in the fluidic devices of the system by a pneumatic-mechanical pressure regulator. However, because the fluidic devices of the system are free of moving parts and have service lives of indefinite length, while the pneumatic-mechanical pressure regulator has both moving parts and an elastomeric diaphragm, the system reliability is compromised by the comparatively short life of the pressure regulator.

Accordingly, a long-recognized need in the fluidics art has been for the provision of a fluidic pressure regulator which is free of moving parts, and has a service life favorably comparable to other fluidic elements.

A conventional hybrid fluidic/mechanical pressure regulator is known in accord with U.S. Pat. No. 3,473,545, issued Oct. 21, 1969 to G.I. Boyadjieff, wherein a jet pressurization amplifier is employed in combination with a vortex amplifier and a diaphragm-operated poppet valve to define a pressure regulator. However, the pressure regulator taught by the '545 patent is believed to suffer from precisely the shortcomings of pneumatic-mechanical pressure regulators outlined above.

Another conventional pressure regulator which is all fluidic is known in accord with U.S. Pat. No. 3,335,737, issued Aug. 15, 1967 to W.F. Gesell, wherein a proportional fluidic amplifier has a fixed orifice on one control port in opposition to a variable orifice on the other control port with both control ports communicating with the unregulated supply pressure. One of the outlet legs is vented, while the other outlet leg provides an allegedly regulated fluid pressure. A feedback channel controlled by a fixed orifice extends from the outlet conveying regulated pressure to a feedback control port disposed in parallel with the other control port having the variable orifice. The Gesell teaching is believed to suffer from several deficiencies including non-constant output pressure with varying inlet pressure, and a relatively narrow regulation range as a function of inlet pressure.

A fluidic control system for a turbine engine is known from U.S. Pat. No. 3,682,192 issued Aug. 1972, to G. E. Davies, wherein a ratiometric relationship is established between two sources of pressurized air, and the resulting ratioed pressure signal is employed to drive a venturi tube. The output pressure signal from the venturi tube in opposition to the pressure of one of the sources of pressurized air is employed to switch a bistable fluidic valve controlling an output actuator. The device taught by Davies displays a considerable hysteresis and nonlinearity which limits its applicability.

SUMMARY OF THE INVENTION

The applicant has discovered that a fluidic amplifier including an inlet port receiving a flow of pressurized elastic fluid and communicating this flow to an outlet port via a properly sized convergent-divergent, or de Laval, nozzle having a pressure tap of selected dimensions at the throat thereof will provide an output fluid pressure signal which in response to increasing input pressure initially bears an inverse relationship, then transitions over a narrow pressure range to a linear positive relationship. The linear positive portion of a graphical relationship curve between the output fluid pressure signal and the input pressure level displays a set point or zero crossing (relative to ambient) at a particular level of inlet fluid pressure, with a considerable range of substantially perfect linearity on each side of this zero crossing pressure. The output fluid pressure signal is substantially free of hysteresis around the zero crossing point.

A particularly advantageous use of the above-described fluidic set point amplifier device is in the provision of a fluidic pressure regulator having no moving parts. The presently disclosed regulator employs staged proportional fluidic amplifiers uniquely arranged in a fluidic circuit which provides an early initiation of regulating action with increasing supply pressure, and a broad range of substantially constant regulated pressure as a function of supply pressure.

Another particularly advantageous use of the above-described fluidic set point amplifier device is in the provision of a turbine engine fuel control having only a single moving part. The fluidic device receives only compressor discharge pressure from the turbine engine and generates an output fluid pressure signal in response thereto. The fuel control includes staged fluidic amplifiers driving a pneumatic actuator portion of a fuel control valve. The combined valve member and actuator piston assembly is the single moving part of the fuel control, and meters fuel to the engine in response to a command signal from the fluidic amplifiers to maintain compressor discharge pressure, and turbine engine speed, within a selected range.

BRIEF DESCRIPTION OF THE DRAWINGS

FIG. 3 graphically presents information concerning a fluid output pressure signal provided by the lamina of FIG. 2 as a function of input supply fluid pressure, and for various thicknesses of the lamina;

FIG. 4 schematically depicts a fluidic circuit including a fluidic device in part defined by the lamina of FIG. 2, and embodied by the fluidic device of FIG. 1;

FIG. 5 graphically depicts a regulated fluid output pressure provided by the fluidic circuit of FIG. 4 as a function of an unregulated supply fluid pressure;

DESCRIPTION OF THE PREFERRED EMBODIMENTS

Figure 1:
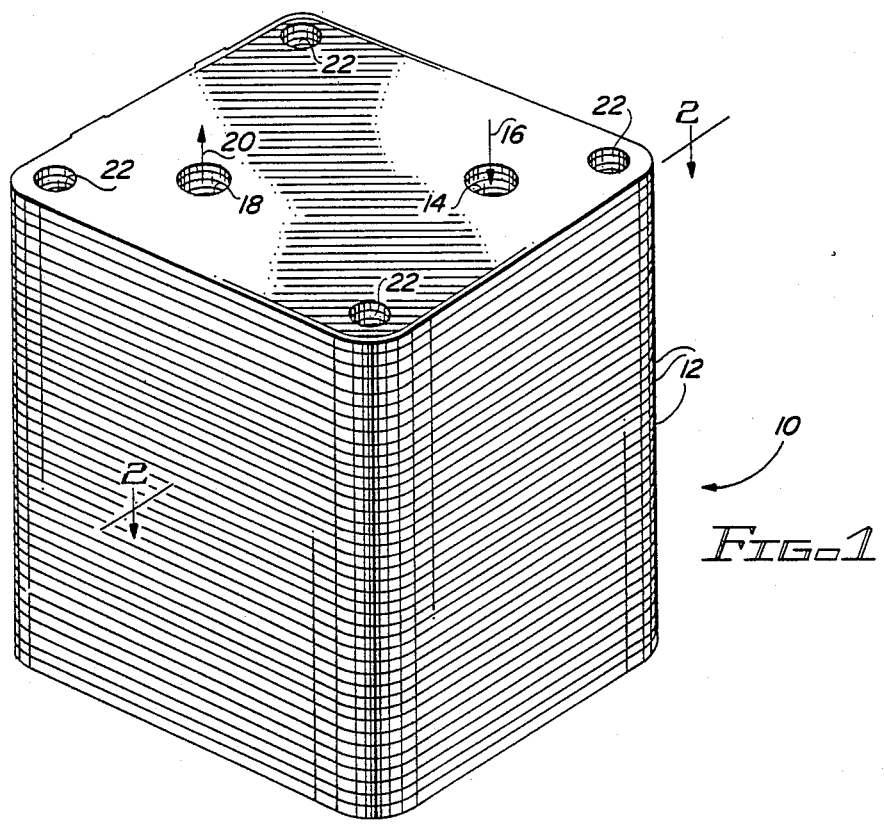
FIG. 1 provides a perspective view of a fluidic device including stacked and interbonded multiple laminae.

FIG. 1 depicts a fluidic device (10) including a plurality of stacked and sealingly interbonded lamina (12). The device (10) defines an inlet (14) to which is supplied a flow of unregulated pressurized fluid, as is depicted by arrow (16). From an outlet (18) defined by the device (10) issues a flow of fluid, depicted by arrow (20), having a fluid pressure level which is a predetermined function of the pressure level of the gas flow (16). The device (10) also defines four through passages (22), which those skilled in the pertinent art will recognize as being used for mutual alignment of the lamina (12) during stacking and interbonding thereof, as well as possibly for mounting of the device (10) to supporting structures (not shown).

Figure 2:
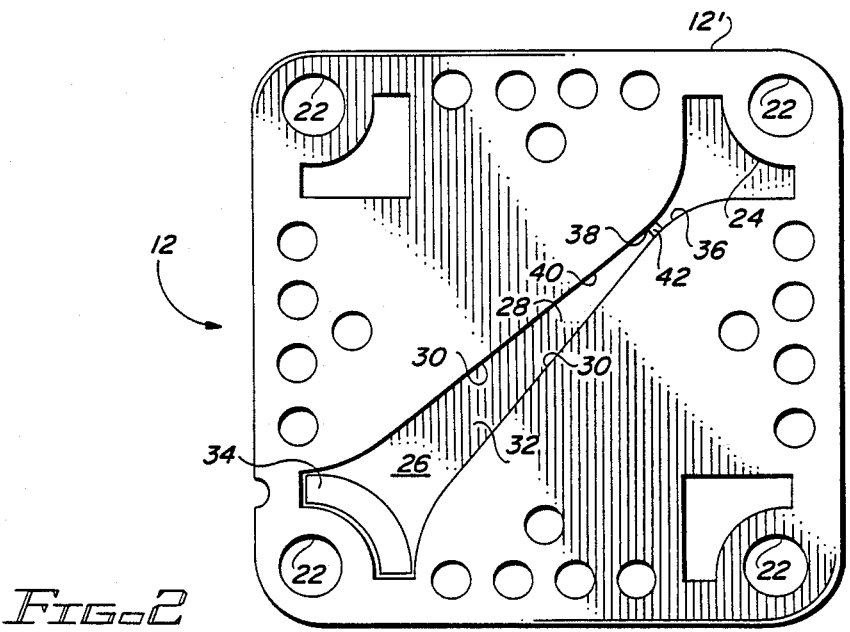
FIG. 2 is a sectional view taken along line 2—2 of FIG. 1 and depicts a particular one of the multiple laminae of the fluidic device of FIG. 1.

A particular one of the lamina (12) is depicted by FIG. 2. The depicted lamina (12') includes an inlet chamber (24) communicating with the inlet port (14) to receive a flow of the fluid (16). It will be understood that the fluid (16) is communicated to chamber (24) by a passage (not shown) defined in overlying ones of the laminae (12). Leading from the inlet chamber (24) to an outlet chamber (26) is a convergent-divergent flow path, generally referenced with the numeral (28). The flow path (28) is defined in part by spaced apart confronting walls (30) of the lamina (12'), and in part by spaced apart substantially parallel surfaces of the overlying and underlying laminae (12), only the underlying surface (32) being visible in FIG. 2. Thus, it will be understood that the flow path (28) is bounded by curvilinear walls (30), by the substantially parallel walls of the adjacent laminae, and is substantially rectangular in cross section transverse to the fluid flow from chamber (24) to chamber (26). It will be seen that the underlying lamina (12) next adjacent to lamina (12') defines a vent port (34) communicating chamber (26) to ambient.

The walls (30) of the lamina (12') define for flow path (28), a converging portion (36) leading from the chamber (24) to a throat portion (38), and a diverging portion (40) extending downstream of the throat (38) to chamber (26). The lamina (12) underlying and next adjacent to the lamina (12') also defines an aperture or port (42), the function of which will be further described hereinafter.

Viewing now FIG. 3, it will be seen that when a flow of air is provided from chamber (24) to chamber (26) via the flow path (28), a fluid pressure signal may be obtained at port (42) with respect to ambient pressure. Importantly, the applicant has discovered that as the thickness of the lamina (12') (transverse to the plane of FIG. 2) is increased from about 0.005 inch (0.127mm) to about 0.05 inch (1.27mm), the resulting fluid pressure signal available at port (42) undergoes a remarkable transformation. The line (44) indicates the pressure trace obtained with a lamina (12') of 0.0005 inch (0.127 mm) thickness. With this thickness, the dimensions of the throat (38) were about 0.005 inch (0.127 mm) by 0.040 inch (1.02 mm), such that laminar or viscous flow phenomena are believed to predominate over compressible flow phenomena. However, with a lamina (12') of 0.010 inch (0.254 mm) thickness as represented at line (46), one begins to see the effect of compressibility of the air flow (i.e., transition to sonic flow, and the choaking of throat (38)). The lines (48, 50, and 52) represent pressure traces obtained with lamina (12') of 0.015 inch, 0.025 inch, and 0.050 inch thickness (0.381 mm, 0.635 mm, and 1.27 mm).

In particular, the line (52) representing a pressure trace for a lamina (12') of 0.050 inch (1.27 mm) thickness, and having a throat of about 0.040 inch (1.02 mm) width, displays a strongly linear negatively sloped portion (54), a rather small (in terms of input pressure range) transition portion (56), and a very strongly linear positively sloped portion (58). Thus, it is seen that the pressure trace line (52) provides a zero crossing (60), or set point pressure whereat the pressure at port (42) matches ambient pressure with a particular inlet pressure. The line (52) also has a region (62) of excellent linearity extending on each side of the zero crossing point (60), and displays virtually no hysteresis in this region. These characteristics for the amplifier described above are highly useful as is explained below.

Attention now to FIG. 4 will reveal a particularly advantageous use for the fluidic set point amplifier described above. The fluidic circuit (64) schematically depicted by FIG. 4 includes a fluidic set point amplifier (12') having a flow path represented by the numeral (28'), a vent (34) and a fluid pressure signal port (42). The port (42) communicates via a conduit (66) with one control port (68) of a propertional fluidic amplifier (70) having its other control port (72) open to ambient, or to another reference pressure source. The output ports (74,76) of the amplifier (70) are connected to respective control ports (78,80) of a second proportional fluidic amplifier (82). Similarly, the second amplifier (82) has its output ports (84,86) connected to respective control ports (88,90) of a third proportional fluidic amplifier (92). One output port (94) of the amplifier (92) is connected to a receiver of regulated air pressure (not shown), as is depicted by the arrow (96). The output port (94) is also connected via a coduit (98) and variable restrictive orifice (100) to the flow path (28) of set point amplifier (12'). A branch conduit (102) from conduit (98) communicates regulated air pressure to the power jet port (104) of amplifier (70). On the other hand, both of the amplifiers (82) and (92) have their power jet ports (106,108) connected to receive unregulated air pressure from an inlet (110) via respective conduits (112,114). A branch conduit (116) communicates unregulated air pressure to the control port (90) of amplifier (92) via an orifice (118). The other output port (120) of amplifier (92) is vented to ambient. Having observed the structure of the fluidic set point amplifier by reference to FIGS. 2 and 3, and the fluidic circuit of FIG. 4, attention may now be given to their operation, in conjunction with an observation of FIG. 5. When unregulated air pressure is initially supplied to inlet (110), the resulting power jet of amplifier (92) issuing from port (108) toward the outlet ports (94,120) is biased toward the port (94) because of fluid flow from the branch conduit (116) and orifice (118), and the result of portion (54) of the response line (52) (viewing FIG. 3) acting through amplifier (70) and (82). As a result, an output pressure is produced at port (94), and is provided to the set point amplifier (12') via conduit (98) and orifice (100) As pressure at inlet (110) increases, the amplifier (12') is driven into its region (62) of linear response. If the pressure at port (94) is less than the desired pressure, the set point amplifier (12') produces a fluid pressure signal which is below the zero crossing (60) of FIG. 3 (subambient). As a result, the power jet of amplifier (70) is driven upward by ambient pressure at control port (72) to produce an output pressure at port (74). The second amplifier (82) is thus driven to produce an output pressure at port (86), and the power jet of amplifier (92) is driven upward to increase the output pressure at port (94).

Conversely, should the pressure at port (94) exceed the desired level, the output at port (42) of amplifier (12') will be above the zero crossing (60) of FIG. 3 (supra-ambient). It follows that the power jet of amplifier (92) will be driven away from port (94) and toward vented port (120) to reduce the pressure at port (94).

FIG. 5 depicts graphically the results of testing an actual reduction to practice of the set point amplifier and fluidic pressure regulator circuit of FIG. 4. The circuit was embodied in a fluidic laminae stack as depicted in FIG. 1. Viewing FIG. 5 it will be seen that the selected pressure was 8 psig, and that the fluidic pressure regulator provided this regulated pressure from approximately 20 psig inlet pressure to about 170 psig inlet pressure. The use of branch passage (116) and orifice (118) is not essential for operation of the fluidic pressure regulator (64), and a greater accuracy of pressure regulation may be achieved without this branch connection however its use is responsible for the early onset of regulating action. On the other hand, above about 170 psig inlet pressure the fluidic amplifiers are simply driven into saturation so that the regulation activity is lost. However, within its range of operation, the fluidic pressure regulator displays excellent output pressure uniformity. The applicant believes such is the case because the set point amplifier displays outstanding linearity within the region (62) as well as an absence of hysteresis. The regulated pressure level may be selected in relation to the zero crossing pressure of the amplifier (12') by variation of the size of orifice (100).

Figure 6:
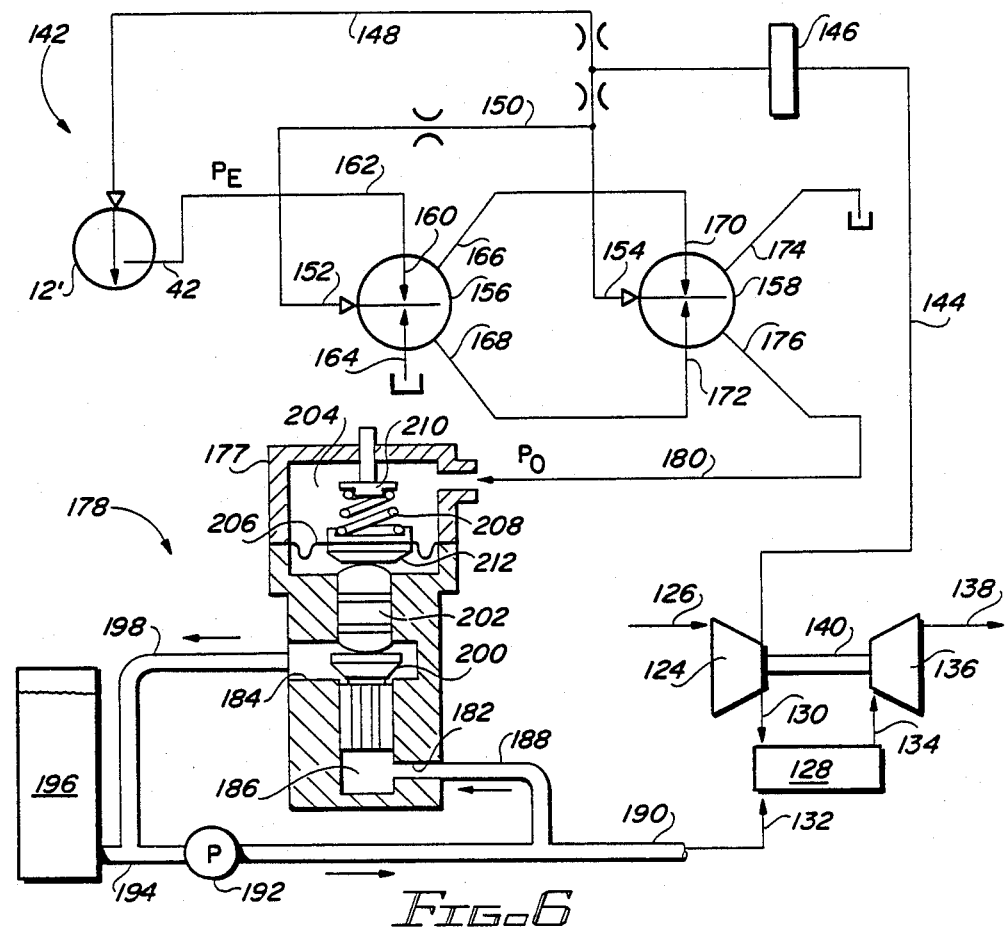
FIG. 6 schematically and partially in cross section depicts a turbine engine fuel control including a fluidic device in part defined by the lamina of FIG. 2.
Figure 7:
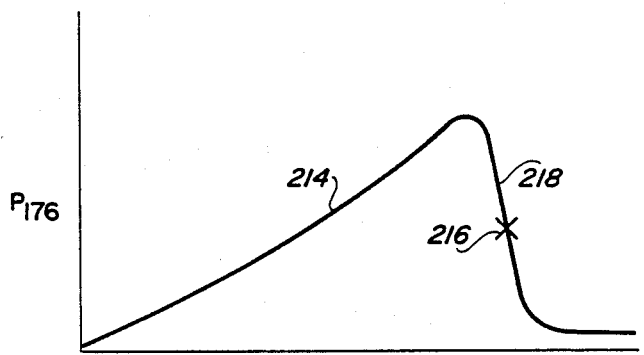
FIG. 7 graphically provides information about a control fluid pressure provided by the apparatus of FIG. 6 as a function of a variable fluid pressure signal.

FIGS. 6 and 7 in combination depict yet another advantageous use of the present fluidic set point amplifier. FIG. 6 shows a combustion turbine engine (122) having a rotary compressor (124) inducting ambient air, as is depicted by arrow (126). The compressor (124) delivers the air pressurized to a combustor (128), as depicted by arrow (130). Within the combustor (128) a flow of combustible jet engine fuel is added, as depicted by arrow (132), to support combustion. The combustion within combustor (128) provides a flow of high temperature pressurized combustion products, as depicted by arrow (134). The products of combustion are expanded in turbine (136) and vented to ambient pressure (arrow (138)) to drive the turbine (136), and compressor (124) via an interconnecting rotary shaft (140).

From the compressor (124) pressurized air, or compressor discharge pressure, ($P_{CD}$) is supplied to a fluidic circuit (142) via a conduit (144) including a filter (146). A conduit (148) supplies $P_{CD}$ to a fluidic set point amplifier (12'), while a conduit (150) supplies $P_{CD}$ to the respective power jets (152,154) of a pair of staged fluidic amplifiers (156,158). The amplifier (156) is connected at one of its control ports (160) by a conduit (162) to the fluid pressure outlet port (42) of the set point amplifier (12'). The other control port (164) of the amplifier (156) communicates with ambient. Outlet ports (166.168) of the amplifier (156) communicate with respective control ports (170,172) of the amplifier (158). One outlet port (174) of the amplifier (158) communicates with ambient, while the other outlet port (176) communicates with the actuator portion (176) of a fuel control valve (178) via a conduit (180).

Viewing now more particularly the fuel control valve (178), it will be seen that this valve includes a housing defining an inlet port (182), an outlet port (184), and a flow path (186) communicating these ports with one another. A branch conduit (188) communicates the inlet port (182) with a conduit (190) extending from a pump (192) to combustor (128). An intake conduit (194) extends from a fuel tank (196) to the pump (192), while a branch line (198) extends from outlet (184) to the conduit (194) intermediate of the tank (196) and valve (178). It will be apparent in light of the above that the valve (178) is disposed as a bypass relief valve so that the pressure of liquid fuel delivered by pump (192) to combustor (128) is determined by the relief pressure of valve (178). In order to control the flow of fuel through flow path (186), a poppet valve member (200) is movably disposed therein. The valve member (200) is movable between an open position and a closed position in opposition to the fuel pressure from pump (192) in accord with the movement of a force transmitting member (202) sealingly received in the housing (178).

The actuator portion (176) of valve (178) includes a chamber (204) which is bounded by a diaphragm (206), and to which conduit (180) opens. A compression spring (208) extends between an adjustably positionable spring support (210) carried by the housing (176), and a spring seat (212) carried by the diaphragm (206). The opposite side of spring seat (212) contacts the force transmitting member (202). Thus, it will be appreciated that the preload of spring (208) may be adjusted to establish a relief fuel pressure which is supplied to combustor (128) by pump (192). That is, in the absence of supra-ambient air pressure in chamber (204), excess fuel is bypassed by valve (178) so that pump (192) cannot supply fuel to combustor (128) at a pressure above that established by the preload of spring (208). When a supra-ambient pressure is supplied to chamber (204), the fuel pressure supplied to combustor (128) is a summation of the base-line pressure established by the preload of spring (208) and the pressure in chamber (204) multiplied by the area ratio of diaphragm (206) over valve member (200).

Recalling now the fluid pressure characteristic of set point amplifier (12') which is depicted in FIG. 3, and viewing FIG. 7, it will be seen that the fluidic circuit (142) provides a relationship between $P_{CD}$ and pressure at port (176) supplied to chamber (204) of actuator (177)

which is particularly advantageous. That is, during starting and acceleration of the turbine engine (10), the compressor (124) provides a progressively increasing $P_{CD}$. The fluidic circuit (142) provides a positively sloped fluid pressure command signal, depicted as line portion (214), which results in a similarly positively sloped fuel pressure supplied to combustor (128) as a function of $P_{CD}$. The portion (214) of the $P_{176}/P_{CD}$ curve is generated in response to the portion (54) of line (52) seen on the graph of FIG. 3. In order to set a desired $P_{CD}$ for the engine (10) point (216), viewing FIG. 7, which corresponds to a desired operating speed for the engine, the characteristic curve of $P_{176}/P_{CD}$ includes a sharply negatively sloped portion (218). This curve portion is provided in response to portion (58) of the $P_{42}/P_{24}$ curve of the fluidic set point amplifier (viewing FIG. 3) by tailoring the gains of the amplifiers (156,158)

Subsequent to the starting of engine (122) its speed and resulting $P_{CD}$ will reach a design operating range at or close to that represented by point (216) on line portion (218). In the event engine load increases, the engine speed and $P_{CD}$ will decrease so that $P_{176}$ increases to provide more fuel to the engine. Similarly, an increase in engine speed and $P_{CD}$ causes $P_{178}$ to decrease so that the fuel supply is decreased to maintain engine speed and $P_{CD}$ in the selected range.

Having described the invention, it should be understood that the description is illustrative rather than restrictive, and that no limitations on the scope of the invention are to be inferred from the design details of the preferred embodiment except as is consistent with the following claims and their equivalents.

What is claimed:

1. Fluidic set point amplifier apparatus comprising: a housing; said housing defining an inlet port communicating with a source of pressurized elastic fluid, an outlet port communicating with a source of reference pressure, and a flow path extending from said inlet port to said outlet port for communicating a flow of said elastic fluid therebetween; said flow defining a convergent-divergent (de Laval) nozzle having a convergent section leading from said inlet port to a throat section of minimum cross sectional flow area, and a divergent section extending downstream of said throat section to said outlet port; and an output signal port communicating with said throat section for providing a fluid pressure level output signal in response to a flow of elastic fluid in said flow path, whereby in response to a progressively increasing pressure differential between said inlet port and said outlet port said fluid pressure level output signal includes a progressively decreasing sub-reference pressure level followed by a progressively increasing sub-reference pressure level increasing to said reference pressure, and a progressively increasing supra-reference pressure level; which increasing sub-reference and supra-reference pressure levels are substantially linearly related to said increasing pressure differential between said inlet port and said outlet port and are substantially free of hysteresis.

2. The invention of claim 1 wherein said throat section is generally rectangular in cross section transverse to flow of said elastic fluid, said throat having an edge dimension in the range from 0.010 inch (0.254 mm) to 0.075 inch (1.91 mm).

3. The invention of claim 2 wherein said throat is generally square in cross section with an edge dimension in the range of from about 0.035 inch (0.89 mm) to about 0.050 inch (1.27 mm).

4. The invention of claim 1 further including proportional fluidic amplifier means for providing a regulated substantially constant fluid pressure output signal from a variable input pressure fluid supply and having a variable gain which is inversely related to a difference between said fluid pressure output signal and a selected value therefor, gain control means receiving as a first gain control signal said fluid pressure level output signal, and conduit means providing a feedback connection from said fluid pressure output signal of said fluidic amplifier means to said inlet port of said fluidic apparatus, thereby to hold said regulated fluid pressure output signal substantially at a constant value despite pressure variation of said input pressure fluid supply within a determined range of the latter.

5. The invention of claim 4 further including a pressure control orifice disposed in said conduit means.

6. The invention of claim 5 wherein said pressure control orifice is selectively adjustable.

7. The invention of claim 4 wherein said proportional fluidic amplifier means comprises a plurality of staged proportional fluidic amplifiers at least two in number: said gain control means including a first of said plurality of staged amplifiers receiving said gain control signal and providing a next successive gain control signal to the next successive staged fluidic amplifier, the last of said plurality of staged fluidic amplifiers having a pair of output ports one of which is vented to said source of reference pressure, and the other of which provides said regulated fluid pressure output signal.

8. The invention of claim 7 wherein said first proportional fluidic amplifier receives at a power jet inlet port thereof a flow of said regulated substantially constant pressure output signal fluid, said first fluidic amplifier having a pair of control ports and a pair of outlet ports, one of said pair control ports communicating with said source of reference pressure while the other of said pair of control ports communicates with said aspiration port to receive said first gain control signal therefrom, said pair of outlet ports communicating respectively each to an individual one of a pair of control ports of said next successive staged fluidic amplifier.

9. The invention of claim 8 wherein said proportional fluidic amplifier means further includes a branch fluid flow connection between said variable input pressure fluid supply and the one of a pair of control ports of the last proportional fluidic amplifier of said plurality, which branch connection increases said regulated fluid pressure output signal in response to a positive fluid pressure from said variable input pressure fluid supply, thereby quickly to drive said regulated fluid pressure output signal toward said constant value thereof in response to initial onset of fluid flow from said variable input pressure fluid supply.

10. The invention of claim 1 wherein said fluidic apparatus comprises a multitude of stacked and sealingly interbonded generally planar laminae, said multitude of lamine defining said convergent-divergent flow path of said set point amplifier apparatus.

11. The invention of claim 1 further including: a combustion turbine engine having a compressor, a combustor, and a turbine, said compressor inducting ambient air and delivering this air pressurized to said combustor, said combustor receiving a flow of fuel from a source thereof along with said pressurized air for supporting combustion producing a flow of high-temperature pressurized motive gas, and said turbine expanding said motive gas to drive said compressor; fluid pressure responsive means for controlling the pressure of said flow of fuel from said source thereof to said combustor directly in relation with a fluid pressure control signal, conduit means communicating said compressor discharge with said fluidic set point amplifier apparatus inlet port, fluidic amplifier means for receiving from said aspiration port said output signal as a primary control signal and providing said fluid pressure control signal in response thereto.

12. The invention of claim 11 wherein said fluidic amplifier means includes a first and a second staged fluidic amplifiers each defining a power jet inlet port, a pair of control inlet ports, and a pair of signal outlet ports; each of said power jet inlet ports receiving fluid from said compressor discharge via said conduit means, said first amplifier receiving said primary control signal at one of said pair of control inlet ports and communicating with ambient via the other of said pair of control inlet ports, said pair of signal outlet ports of said first amplifier communicating each with a respective one of said control inlet ports of said second amplifier.

13. The invention of claim 12 wherein said second fluidic amplifier at one of said signal outlet ports thereof communicates with ambient and the other of said pair of signal outlet ports communicates with said fluid pressure responsive means for controlling the pressure of said flow of fuel to said combustor.

14. The invention of claim 11 wherein said fuel source includes a fuel reservoir and a fuel pump receiving fuel from reservoir and delivering said fuel pressurized to said combustor via a fuel conduit, said fluid pressure responsive means receiving pressurized fuel from said conduit and bypassing fuel therefrom to said reservoir in inverse response to the pressure level of said fluid pressure control signal, thereby to control the pressure of said fuel delivered to said combustor.

15. The invention of claim 14 wherein said fluid pressure responsive means includes a fluid pressure responsive valve having a housing; said valve housing defining an inlet port, an outlet port, and a fuel flow path extending between said inlet port and said outlet port, a pressure responsive value member movably disposed in said flow path and movable between a first position closing said flow path, and a second position allowing fluid flow in said flow path in response to fluid pressure at said inlet port, resilient means yieldably biasing said valve member to said first position, movable pressure-responsive wall means for cooperating with said housing to define a variable-volume chamber, said housing defining a control inlet port communicating said fluid pressure control signal with said variable-volume chamber, and force transmitting means coupling said movable wall means with said valve member to move the latter toward said first position thereof in response to movement of said wall means expanding said variable-volume chamber.

16. The method of providing a set point fluid pressure signal which has a zero gauge pressure value at a determined set point pressure for a variable fluid pressure supply, and a linear hysteresis-free relationship with said variable fluid pressure supply both above and below said zero pressure value, said method comprising the steps of:
providing a convergent-divergent (de Laval) flow path having a throat section of minimum cross sectional area;
flowing fluid from said variable fluid pressure supply through said flow path while causing said fluid flow to achieve mach 1 at said throat;
providing a signal channel opening to said flow path at said throat; and
obtaining said set point fluid pressure from said throat via said signal channel.

17. The method of claim 16 further including the step of: configuring said throat to a rectangular shape in cross section transverse to said fluid flow, and selecting the edge dimensions of said rectangular throat shape in the range from about 0.010 inch (0.254 mm) to about 0.075 inch (1.91 mm).

18. The method of claim 17 further including the step of selecting the edge dimensions of said rectangular throat shape in the range from about 0.035 inch (0.89 mm) to about 0.050 inch (1.27 mm).

19. The method of claim 16 further including the steps of employing a plurality of laminae to define said convergent-divergent flow path, using one lamina of said plurality to define a pair of confronting convergent-divergent walls of said flow path, employing next-adjacent lamine to said one lamina in said plurality to define a pair of confronting substantially parallel wall for said flow path, and using an orifice defined by one of said next-adjacent laminae aligning with said throat to communicate said signal channel with said throat.

20. The method of claim 19 further including the steps of employing said plurality of lamine to define fluidic amplifiers, associating said fluidic amplifiers with one another to amplify an input signal, and conveying said set point fluid pressure via said orifice and said signal channel to said fluidic amplifiers as said input signal.

* * * * *